US009906596B2

(12) United States Patent
Sikdar

(10) Patent No.: US 9,906,596 B2
(45) Date of Patent: Feb. 27, 2018

(54) RESOURCE NODE INTERFACE PROTOCOL

(71) Applicant: Kodiak Data, Inc., Los Altos, CA (US)

(72) Inventor: Som Sikdar, Los Altos, CA (US)

(73) Assignee: Kodiak Data, Los Altos, CA (US)

(*) Notice: Subject to any disclaimer, the term of this patent is extended or adjusted under 35 U.S.C. 154(b) by 471 days.

(21) Appl. No.: 14/603,920

(22) Filed: Jan. 23, 2015

(65) Prior Publication Data

US 2018/0013826 A1   Jan. 11, 2018

(51) Int. Cl.
*G06F 17/30* (2006.01)
*H04L 29/08* (2006.01)

(52) U.S. Cl.
CPC .... *H04L 67/1097* (2013.01); *G06F 17/30598* (2013.01)

(58) Field of Classification Search
CPC ................................................ G06F 17/30598
USPC ........................................................ 707/737
See application file for complete search history.

(56) References Cited

U.S. PATENT DOCUMENTS

| 6,343,346 | B1* | 1/2002 | Olnowich | ........... G06F 12/0817 711/121 |
| 8,239,584 | B1 | 8/2012 | Rabe | |
| 8,296,434 | B1* | 10/2012 | Miller | ................ H04L 67/1029 709/220 |
| 9,239,786 | B2 | 1/2016 | Ki | |
| 2002/0129216 | A1 | 9/2002 | Collins | |
| 2006/0075198 | A1 | 4/2006 | Susaki | |
| 2006/0212719 | A1 | 9/2006 | Miyawaki | |
| 2009/0249013 | A1* | 10/2009 | Daud | .................. G06F 11/0709 711/163 |
| 2009/0288084 | A1* | 11/2009 | Astete | ................. G06F 9/45533 718/1 |
| 2011/0225121 | A1* | 9/2011 | Cooper | ............. G06F 17/30578 707/634 |
| 2013/0073702 | A1 | 3/2013 | Umbehocker | |
| 2016/0124462 | A1 | 5/2016 | Sikdar | |
| 2016/0259586 | A1 | 9/2016 | Tylik | |

FOREIGN PATENT DOCUMENTS

EP       1717688 A1    11/2006
WO    2013/188382 A2    12/2013

* cited by examiner

*Primary Examiner* — Mark E Hershley
(74) *Attorney, Agent, or Firm* — Schwabe, Williamson & Wyatt

(57) ABSTRACT

A distributed storage system includes multiple resource nodes each having associated storage media. The resource nodes are configured to operate a first protocol between the resource nodes that exchanges availability and performance information for storage elements in the associated storage media. The resource nodes also operate a second protocol that dynamically distributes and redistributes data between the different resource nodes based on the availability and performance information for the storage elements. Relative distances may be identified between the different resource nodes and the second protocol may weight the availability and performance information based on the relative distances. The second protocol also may identify types of unshared use, shared use, and concurrent use for different portions of the data and distribute the portions of the data to other resource nodes based on the identified types of use.

19 Claims, 12 Drawing Sheets

RESOURCE NODE INTERFACE PROTOCOL

The present application incorporates by reference U.S. patent application Ser. No. 14/533,214, filed Nov. 5, 2014, Entitled: CONFIGURABLE DOCK STORAGE in its entirety.

BACKGROUND

A block storage system uses protocols, such as small computer system interface (SCSI) and advanced technology attachment (ATA), to access blocks of data. The block storage system may use caching and/or tiering to more efficiently access the blocks of data. The block storage system also may use a virtual addressing scheme for provisioning, de-duplication, compression, caching, tiering, and/or providing resiliency of data stored on different physical media through methods such as replication and migration. Virtual addressing allows the user of the storage system to access blocks of data on the storage system while allowing the storage system administrator to manage media count and types, access methods, redundancy and data management features without the users' knowledge.

A file storage system manages the data blocks and metadata associated with different files. Files can have variable sizes and may include metadata identifying the associated data blocks. A user of a file storage system may access files or portions of files whereas the metadata is typically managed by and only accessed by the file storage system. The file storage system may de-duplicate, compress, cache, tier and/or create snapshots of the file data. An object storage system uses handles to put or get objects, usually in their entirety, from object storage. Object storage systems can perform timeouts, scrubbing, caching and/or checkpoints on the stored objects. The file storage system may operate on top of the block storage system and the object storage system either may operate on top of the block storage system or operate on top of the file storage system. A user of an object storage system may access objects whereas the underlying block or file storage is typically managed by and only accessed by the block or file storage system.

Clients may access data differently and thus have different storage requirements. For example, a first user may perform transactional operations that read and write data into random storage locations. A second user may perform analytic operations that primarily read large blocks of sequential data. In such a case, the performance of the first user may be limited by the number of random operations of the storage system while the performance of the second user may be limited by the bandwidth capability of the storage system.

For example, the first user may need to recover data after a hardware or software failure. The storage administrator may configure a redundancy storage extension for the storage system, such as redundant array of independent disks (RAID) that strips the same data on multiple different disks.

The second analytic user may not need data redundancy. However, the redundancy storage extension is used throughout the storage system regardless of which user accesses the disks. Overall storage capacity is unnecessarily reduced since redundant backup data is stored for all users.

In a further example, a first user requiring redundancy and a second user requiring highest write performance both need access to the same data with some of that data accessed concurrently by both users. If the required data exists upon the same virtual storage (the same Logical Unit Number—LUN), the storage administrator will be required to configure the entire LUN for the redundancy requirement of the first user which reduces the performance for the second user.

The storage administrator also may configure a caching or tiering policy that uses random access memory (RAM) and/or Flash memory to increase access rates for the random read and write operations performed by the first user. The caching or tiering policy is commonly applied to the entire storage system for all storage accesses by all users and minimally to all users of the particular storage data. As an example, if a block storage system enables caching for a particular disk (virtual or physical), said caching is enabled and functions equivalently for all clients accessing said storage data.

The caching or tiering policy may increase data access speeds for the first user but may provide little improvement for the large sequential read operations performed by the second user. Applying the caching or tiering policy to all storage operations may actually reduce storage performance. For example, data from large sequential read operations performed by the second user may flush data from RAM or Flash memory currently being cached or tiered for the first user. Additionally, read accesses from a non-benefitting user will evict data within the cache to the likely detriment of the benefitting user, thereby reducing performance for both users.

DETAILED DESCRIPTION

Figure 1:
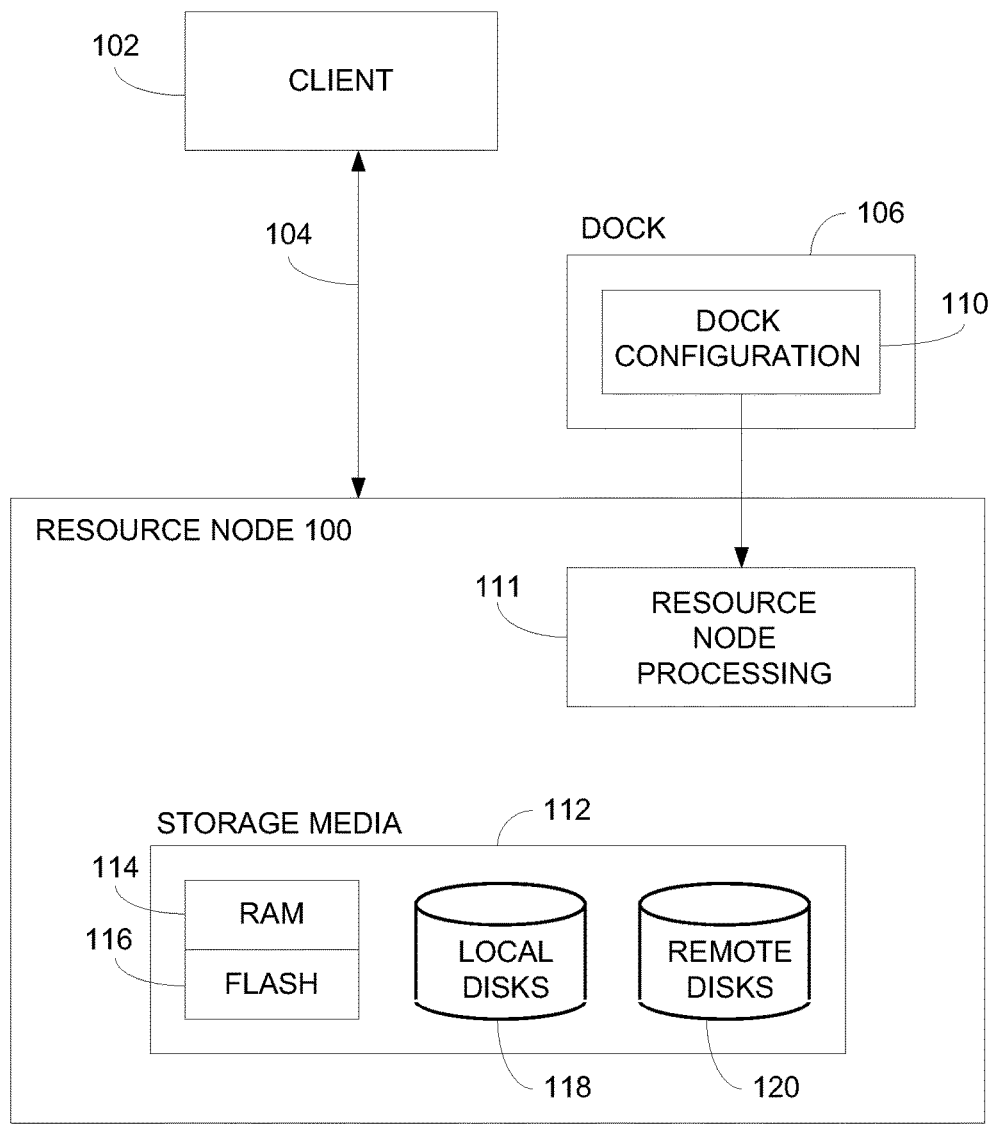
FIG. 1 depicts an example resource node.

A distributed storage system includes multiple resource nodes each having associated storage media. The resource nodes are configured to operate a first protocol between the resource nodes that exchanges quantity and performance information for storage media elements in the associated storage media. The resource nodes also operate a second protocol that dynamically distributes and redistributes data from the local storage media among the different resource nodes based on the quantity and performance information of the storage media elements. Redistribution may occur on the basis of resource performance or other factors identifiable by the resource nodes but not identifiable by any element accessing data within a resource node. Because of this capability, a first resource node may provide access to data located on storage media located within a second resource node in a manner that indicates to the accessing element that the data is present within the first resource node.

The first protocol also may identify the relative distances between the different resource nodes and the second protocol may weight the quantity and performance information based on the relative distances. Distance information may be related to physical location such as physical server, equipment rack, rack column or data center, to network topology such as number of routing hops or bandwidth of routed links or other metrics relevant to the architecture of the underlying hardware and software.

Each resource node may identify types of data usage for the virtual data storage presented by the distributed storage system, such as unshared use, shared use, and concurrent use for discrete ranges of that virtual data storage and distribute the portions of the data to other resource nodes based on the identified types of use. The second protocol, identifying the performance of the available storage media within other resource nodes, may be utilized to calculate the optimal spreading of data based on the data usage for the virtual data storage presented and other factors including availability and distance of the other resource nodes.

In one example, a first resource node identifies a LUN, presented as a virtual disk to storage users, as having concurrent use within a specific range of LUN address space. If a neighboring second resource node has more available high-performance Flash memory, the appropriate media for highly concurrent data, than the first resource node, the first resource node may transfer the data within that range of LUN address space to the second resource node. In another example, the first resource node evaluates the expected performance that would be achieved using the high-performance media within the second resource node using the distance metric to the second resource node.

Existing storage systems may determine the constituent storage media for a specific virtual data storage, e.g. a virtual disk or LUN. The resources of the storage system, which may be distributed over multiple storage systems and enclosures, do not dynamically reconfigure data placement or move data to other resources without the control of a centralized storage system control process. It is this centralized storage system control process that must monitor individual resources to determine where new data should be placed. Furthermore, these resources typically have a fixed resiliency configuration for all presented resources.

Centralized tracking of resource availability, configuration and performance detracts from the performance of distributed storage systems. The present resource nodes act independently and in real-time with respect to storage accesses to the distributed storage system, perform the functions of dynamically moving data to and from other resource nodes for purposes including optimizing performance, availability, and reacting to changes in the overall media composition or usage of the data on this media by storage users. Whereas prior storage systems virtualize disks (LUNs) to the storage user, the resource nodes virtualize the performance, resiliency and management features of discrete ranges of the data space of each disk (LUN), thereby greatly reducing the computation requirements of the aforementioned disk-level virtualization.

FIG. 1 shows a client 102 connected to a resource node 100. Client 102 may comprise any device or application that writes and/or reads data to and from another device. For example, client 102 may comprise one or more servers, server applications, database applications, routers, switches, client computers, personal computers (PCs), Personal Digital Assistants (PDA), smart phones, digital tablets, digital notebooks, or any other wired or wireless computing device and/or software that accesses data.

In another example, client 102 may comprise a stand-alone appliance, device, or blade. In another example, client 102 may be a processor or software application in a personal computer or server that accesses resource node 100 over an internal or external data bus. In yet another example, client 102 may comprise gateways or proxy devices providing access to storage system 100 for one or more stand-alone appliances, devices or electronic entities.

Resource node 100 may operate on a processing system, such as a storage server, personal computer, etc. Resource node 100 may operate with other resource nodes on the same storage server or may operate with other resource nodes 100 operating on other storage servers.

Storage media 112 may comprise any device that stores data accessed by another device, application, software, client, or the like, or any combination thereof. For example, storage media 112 may comprise one or more solid state device (SSD) chips or dies that contain one or more random access memories (RAMs) 114 and/or Flash memories 116.

Storage media 112 also may include local storage disks 118 and/or remote storage disks 120. Disks 118 and 120 may comprise rotating disk devices, integrated memory devices, or the like, or any combination thereof. Remote disks 120 also may include cloud storage including cloud storage application programming interfaces (APIs) to cloud storage services.

Resource node 100 may exist locally within the same physical enclosure as client 102 or may exist externally in a chassis connected to client 102. Client 102 and the computing device operating resource node 100 may be directly connected together, or connected to each other through a network or fabric. In one example, client 102 and resource node 100 are coupled to each other via wired or wireless connections 104.

Different communication protocols can be used over connection 104 between client 102 and resource node 100. Example protocols may include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE), Internet protocols, Ethernet protocols, or the like, or any combination thereof. Protocols used between client 102 and resource node 100 also may include tunneled or encapsulated protocols to allow communication over multiple physical interfaces such as wired and wireless interfaces.

A dock 106 comprises any portal with memory for storing one or more dock configurations 110. In one example, dock configuration 110 is an extensible markup language (XML) file that defines a set of storage extensions that determine how resource node 100 appears to client 102, or any other clients, that dock to resource node 100.

A storage administrator may create a file in dock 106 containing dock configuration 110. For example, the storage administrator may create a dock configuration 110 with a set of storage extensions optimized for analytic clients. The storage administrator directs resource node 100 to load dock configuration 110.

Resource node 100 is effectively docked as specified in dock configuration 110. For example, loading dock configuration 110 may cause resource node 100 to open an IP address on an ISCSI port for receiving ISCSI commands.

Resource node 100 then uses dock configuration 110 for any client 102 using the specified IP address. For example, client 102 may connect to resource node 100 via an Internet protocol (IP) address or port address that is associated with dock configuration 110. Resource node processing 111 identifies client 102 as docked and performs storage operations that implement the storage extensions identified in dock configuration 110.

In another example, dock configuration 110 may not specify a specific IP address or port for dock configuration 110. Resource node 100 then may apply dock configuration 110 for all clients 102 regardless of which IP addresses are used for accessing resource node 100. The address and port identifiers used in dock configuration 110 may vary depending on the protocol used for connecting client 102 to resource node 100.

Dock configuration 110 provides client-based access to storage media 112 verses conventional storage systems that are configured with a set of storage extensions independently the clients accessing storage media 112. Resource node 100 more efficiently accesses storage media 112 by implementing storage operations with RAM 114, Flash 116, local disks 118, and remote disks 120 based on the dock configuration 110 associated with client 102. Thus, resource node 100 may provide different storage extensions based on the dock configuration 110 associated with client 102.

Additional details discussing how resource node 100 performs different storage operations is described in co-pending U.S. patent application Ser. No. 14/533,214, filed Nov. 5, 2014, entitled: CONFIGURABLE DOCK STORAGE which has been incorporated by reference in its entirety.

Figure 2:
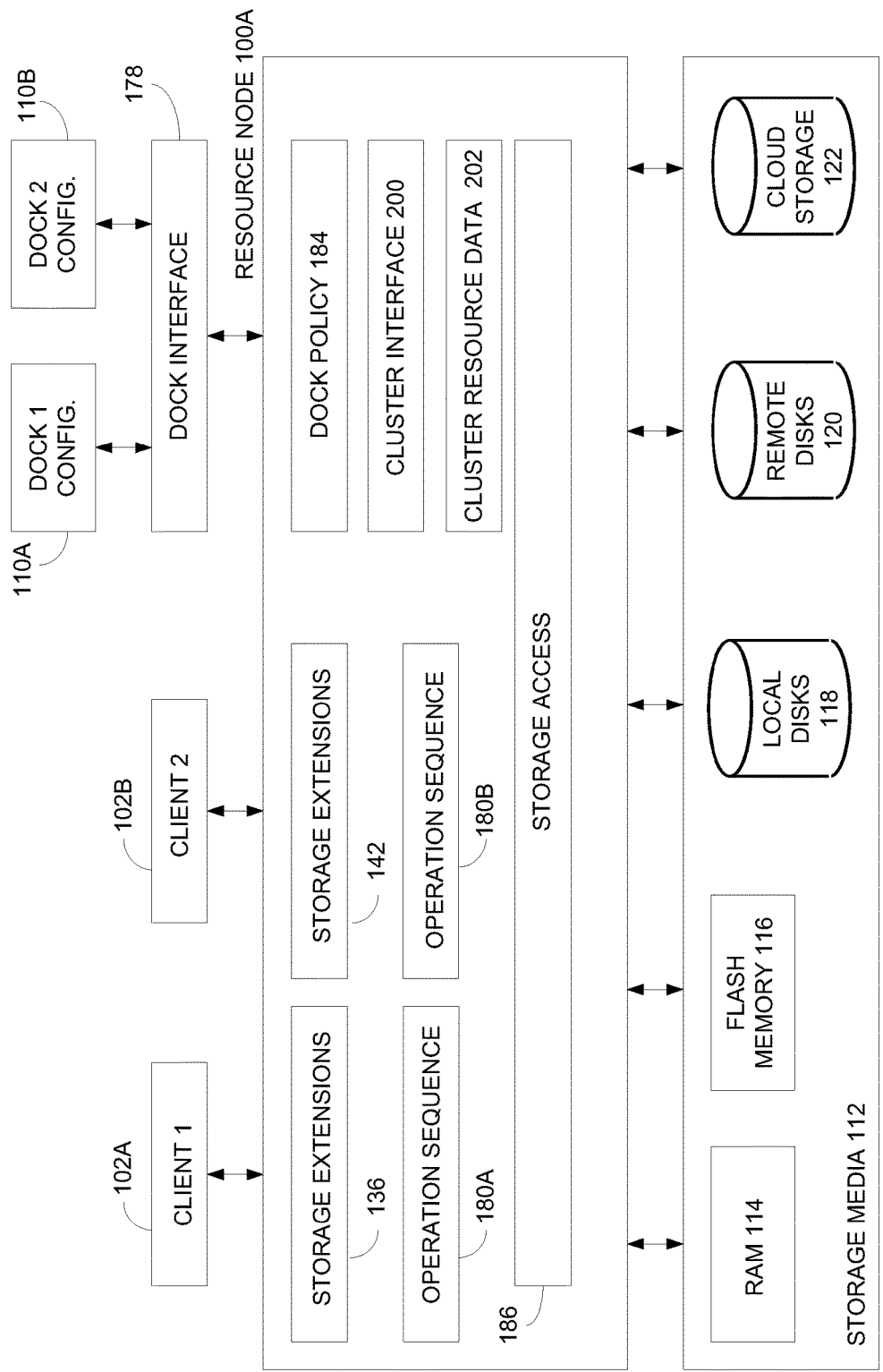
FIG. 2 depicts an example resource node that uses a cluster interface for communicating with other resource nodes.

FIG. 2 shows an example of how a resource node 100A uses dock configurations 110A and 110B. The storage administrator docks resource node 100A by loading dock configuration 110A and dock configuration 110B into resource node 100A via a dock interface 178. For example, the storage administrator may use a personal computer to create XML files that contain dock configurations 110A and 110B. The storage administrator then loads dock configurations 110A and 110B on resource node 100A via dock interface 178.

Resource node 100A conducts a dock policy 184 for docking clients 102, undocking clients 102, and performing storage operations based on storage extensions 136 and 142. A processor generates an operation sequence 180A to implement storage extensions 136 associated with dock configuration 110A and generates an operation sequence 180B to implement storage extensions 142 associated with dock configuration 110B.

Operation sequence 180A is used for processing storage requests received from client 102A. For example, operation sequence 180A may cache or tier data from read and write operations in RAM 114 or Flash 116, provide redundancy for data writes, and use local disks 118 for storing data.

Operation sequence 180B is used for executing the storage requests received from client 102B. For example, operation sequence 180B may not cache and tier data, but may perform read aheads that read additional sequential blocks of data into RAM 114 and/or Flash 116. Operation sequence 180B also may selectively store data into remote disks 120 and/or cloud storage 122.

Storage access layer 186 includes any storage access protocols used for accessing RAM 114, Flash 116, local disks 118, remote disks 120, and cloud storage 122. For example, local storage, such as RAM 114, Flash 116, and local disks 118 may be accessed through a driver as "devices" or locally available disks. Local storage such as RAM 114 and Flash 116 may additionally be accessed as memory by configuring storage media 112 to appear in a processor memory map or as media accessible by a high-speed protocol such as NVMe or RDMA.

Remote disks 120 or other remote storage may be accessed by protocols supported by the remote storage system. Cloud storage 122 may be accessed using access methods provided by the cloud provider which may include the same protocols used to access remote disks 120.

Storage access layer 186 may dynamically add remote disks 120 and cloud storage 122 to resource node 100A based on storage extensions 136 and 142. Storage extensions 142 may not care if data is stored in local disks 118, remote disks 120, or cloud storage 122. Storage access layer 186 may dynamically move data associated with client 102B into remote disks 120 and/or cloud storage 122 based on current capacities in storage media 112. Thus, resource node 100A may use different types of storage media 114, 116, 118, 120 and 122 on a per client bases.

Storage access layer 186 may conduct some storage operations for implementing storage extensions 136 and 142 on top of internal storage operations performed in storage media 112. For example, storage access layer 186 may conduct a redundancy operation based on storage extensions 136 that writes 1.5 blocks of data for every 1.0 block write operation received from client 102A. This may prevent data loss during a connection outage since the same data is recoverable from different physical disks.

Resource node 100A may not need to interact with the internal storage operations performed within storage media 112 underneath storage access layer 186. Resource node 100A may only need to access available storage 112 and know storage capacity and storage performance characteristics.

Cluster Resource Interface

Figure 3:
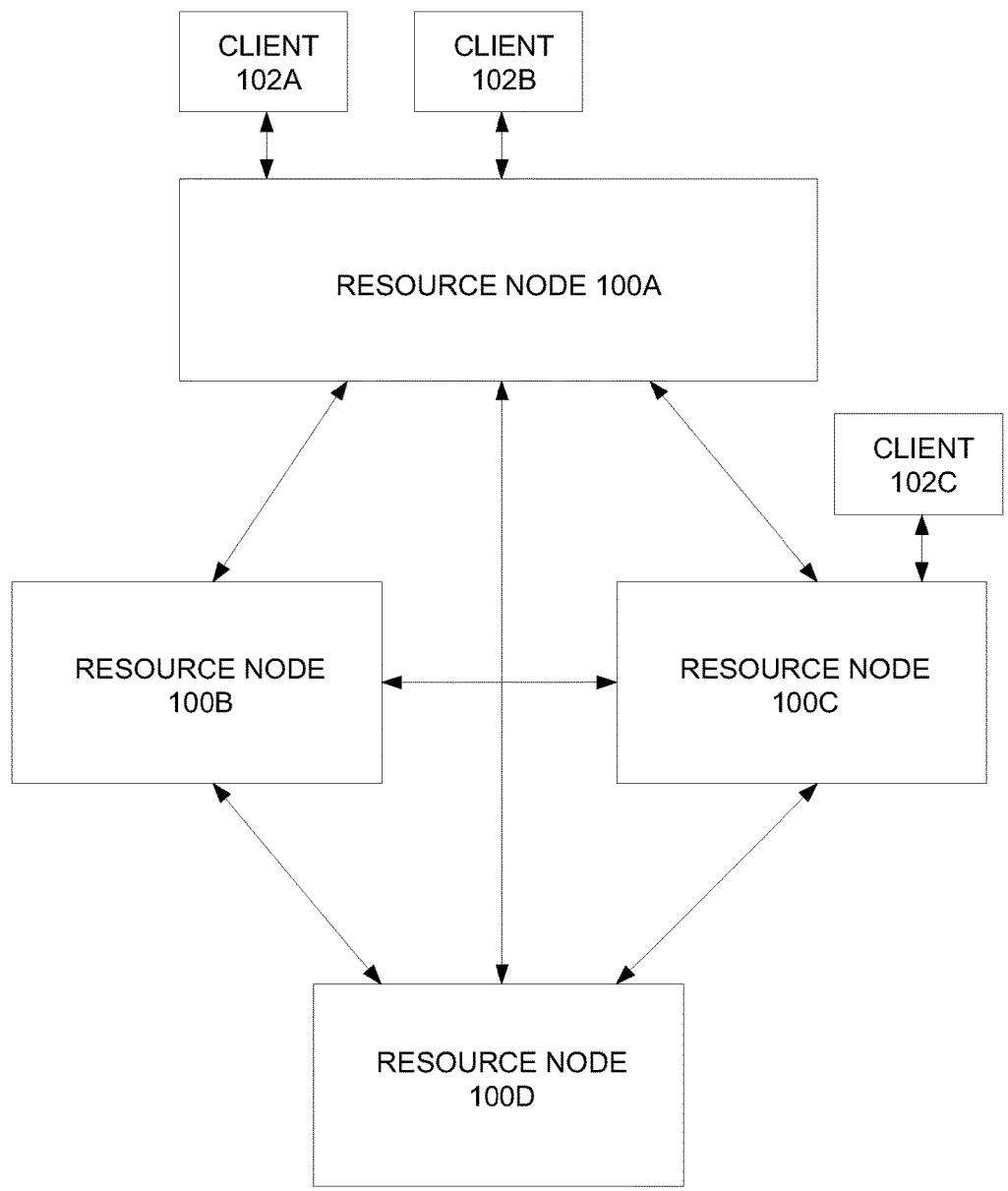
FIG. 3 depicts an example cluster of resource nodes.

Referring to FIGS. 2 and 3, resource nodes 100A-100D are connected together via any known network connection protocol. In one example, two different clients 102A and 102C may connect to resource nodes 100A and 100C, respectively. Some of resource nodes 100 may be located in a same storage server and other resource nodes 100 may be located on different storage servers.

Each resource node 100 may include a cluster interface 200 and cluster resource data 202. Cluster interface 200 may operate a first protocol between resource nodes 100A-100D that exchanges quantity and performance information for storage elements in the associated storage media 112. Cluster interface 200 also operates a second protocol that dynamically distributes and redistributes data between different resource nodes 100A-100D based on the availability, quantity, and performance information for the storage elements.

The first protocol may identify relative distances between the different resource nodes 100 and the second protocol may weight the availability, quantity, and performance information based on the relative distances. The resource node may then identify types of unshared use, shared use, and concurrent use for different portions of the data and utilize the second protocol to distribute the portions of the data to other resource nodes 100 based on the identified types of use.

Figure 4:
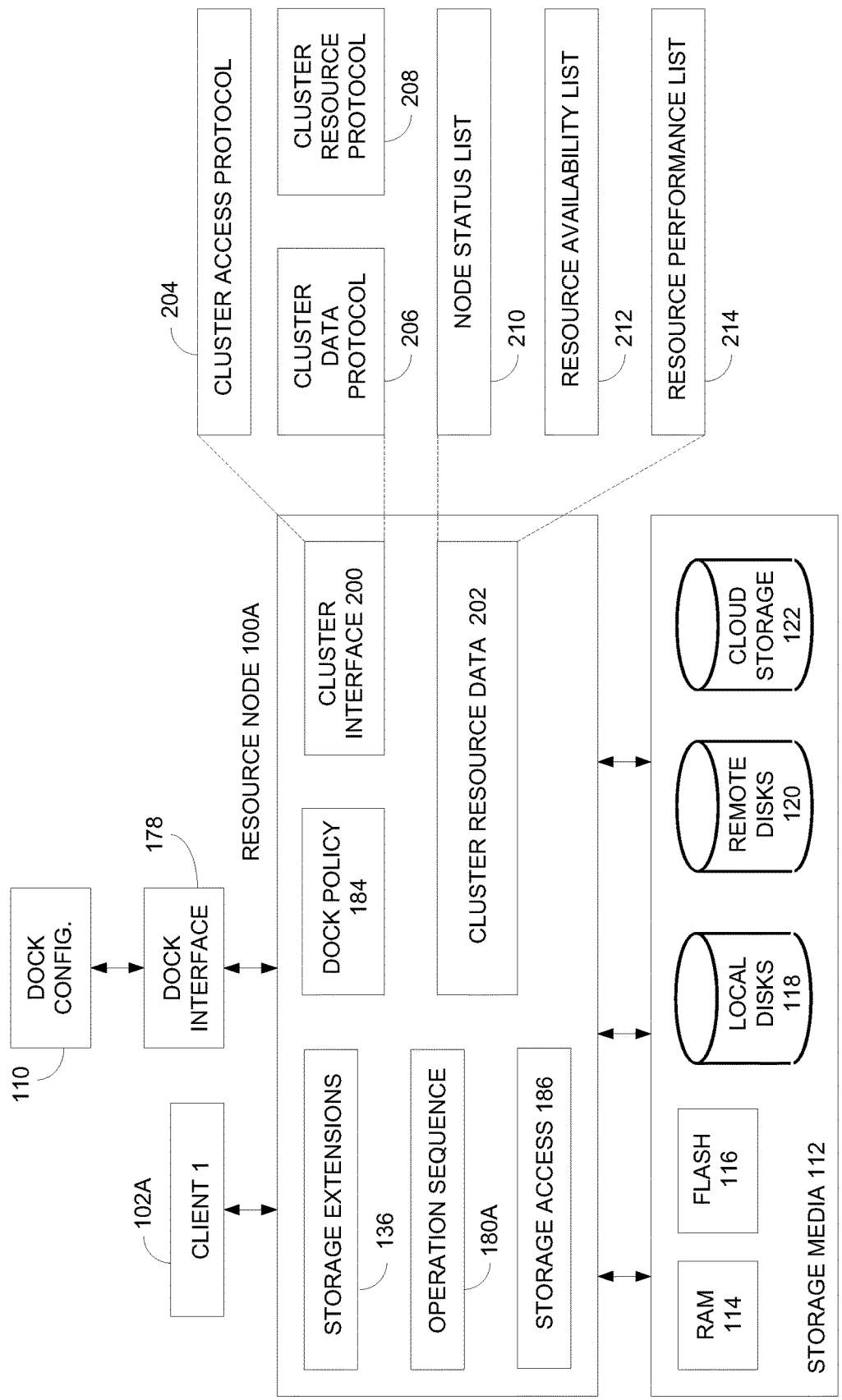
FIG. 4 depicts an example cluster interface and example cluster resource data in more detail.

FIG. 4 shows cluster interface 200 and cluster resource data 202 in more detail. Cluster interface 200 includes two protocol layers. The first protocol layer comprises a cluster access protocol 204 and the second protocol layer includes a cluster data protocol 206 and a cluster resource protocol 208 that run underneath cluster access protocol 204.

Cluster access protocol 204 establishes a reliable connection with other resource nodes for routing messages and data. Cluster access protocol 204 may operate similar to a transmission control protocol (TCP) ensuring successful data transfers. For example, cluster access protocol 204 may perform packet resends, heartbeats, monitor bandwidth, and rerouting for messages and data sent using cluster data protocol 206 and cluster resource protocol 208. Cluster access protocol 204 may determine status information for the different resource nodes maintained in a node status list 210.

In one example, cluster access protocol 204 may use a communication protocol such as Node.JS for communicating with other server devices. Node.JS is an open source, cross-platform runtime environment for server-side and networking applications. Of course, resource nodes 100 also may use other communication protocols.

Cluster resource protocol 208 exchanges resource update messages between different resource nodes 100 over cluster access protocol 204. The messages contain updates to cluster resource data 202 that includes resource availability lists 212 and resource performance lists 214 for different resource nodes 100.

Node status list 210 identifies the status of resource nodes, such as available, read only, or offline. Resource availability list 212 identifies quantities of different types of storage available on resource nodes 100, such as amounts of available Flash, RAM and disk storage. Resource performance list 214 identifies relative performance associated with the different storage resources, such as normalized values associated with read and/or write speeds.

Cluster data protocol 206 dynamically distributes data requests and associated data between the different resource nodes 100. For example, resource node 100A may receive storage requests and store associated data in storage media 112. Cluster data protocol 206 may distribute or redistribute the storage requests and associated data to other resource nodes responsive to resource update messages containing cluster resource data 202.

For example, resource node 100A may receive storage requests from client 102A that use different combinations of storage elements 114, 116, 118, 120, and/or 122 in storage media 112. Cluster data protocol 206 may access cluster resource data 202 to determine the availability of storage elements 114, 116, 118, 120, and/or 122 in storage media 112 and the availability of storage elements in the storage media 112 of other resource nodes 100B-100D in FIG. 3. Based on cluster resource data 202, resource node 100A may process the storage operation in storage media 112 or distribute the storage requests and associated data to other resource nodes. Client 102A may have no knowledge resource node 100A redistributed the data and storage requests to other resource nodes. However, distributing data to other resource nodes may provide more efficient storage operations both for client 102A and for other clients docked to other resource nodes.

Figure 5:
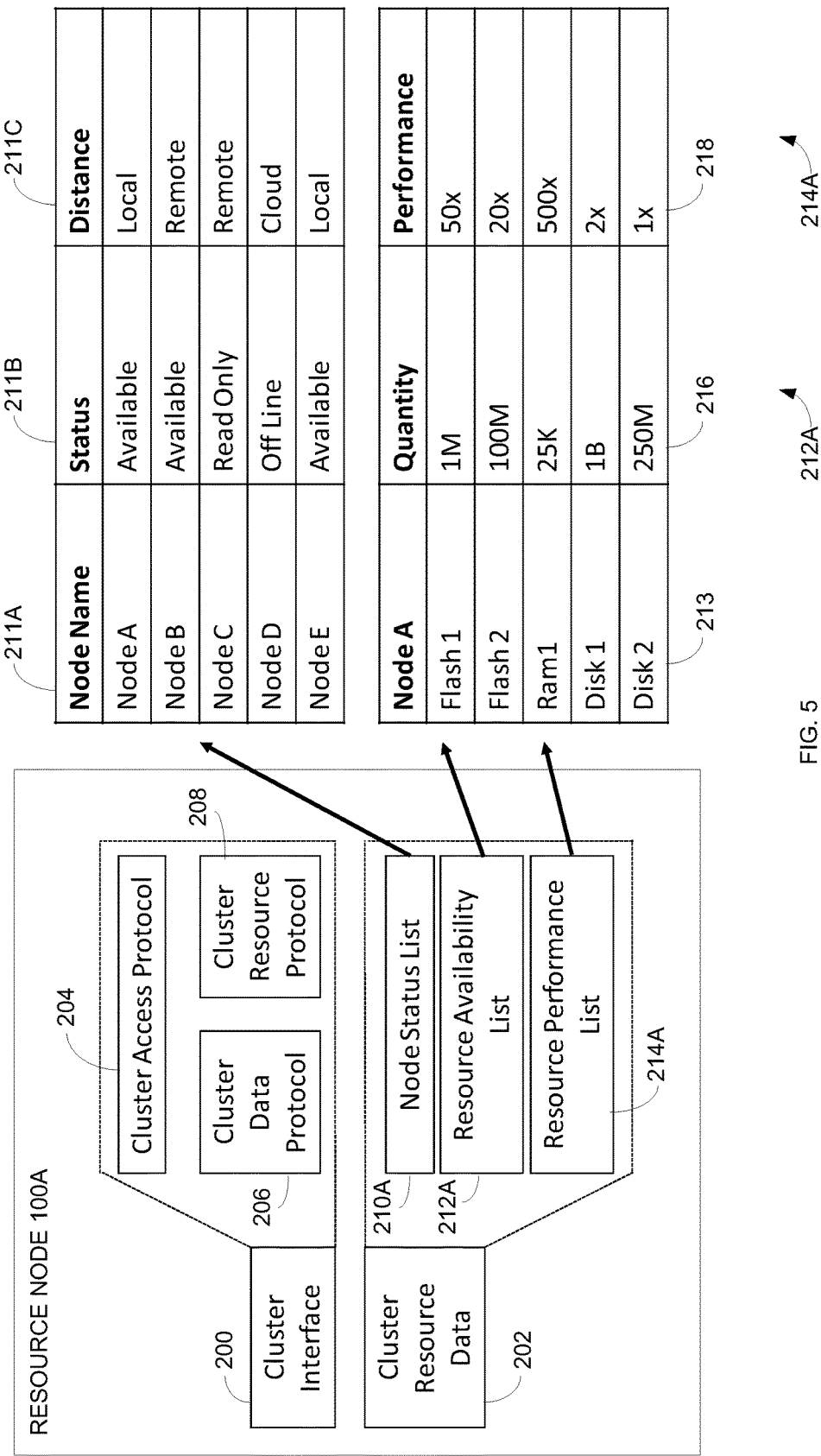
FIG. 5 depicts example cluster resource data in more detail.

FIG. 5 shows cluster resource data 202 in more detail. Node status list 210A includes resource node identifiers 211A, status values 211B, and distance values 211C. Resource node identifiers 211A identify other resource nodes 100 located on any local area network (LAN), wide area network (WAN), datacenter, etc. In this example, cluster resource protocol 208 identified five resource nodes A-E.

Status values 211B indicate an availability of resource nodes A-E. For example, status values 211B may identify availability of resource node A-E as available, read only, or off line.

Distance values 211C indicate a location of the resource node relative to resource node 100A. For example, cluster access protocol 204 may identify resource nodes operating within a same server as resource node A as "local". Cluster access protocol 204 may identify other resource nodes operating on different servers but within a same datacenter or LAN as "remote". Cluster access protocol 204 may identify resource nodes operating outside of the datacenter or LAN of resource node 100A, or operating within known cloud networks, as "cloud."

In another example, cluster access protocol 204 may identify resource nodes operating on a same server as "local 1." Cluster access protocol 204 may identify another resource node operating on a different server but operating within a same rack as "local 2." Cluster access protocol 204 may identify a resource node located on a different adjacent rack as "remote 1" and may identify a resource node located in a different data center but connected with the server containing resource node 100A over a dedicated fiber connection as "remote 2."

Cluster access protocol 204 may generate distance value 211C based on Internet Protocol (IP) addresses, port addresses, or any other network address, server address, or device labeling associated with resource nodes 100. Of course, these are just examples and cluster access protocol 204 may use other categories for status values 211B or for distance value 211C. Cluster access protocol 204 is described as generating node status list 210A. However, in other examples any of protocols 204, 206, or 208 may generate any of lists 201A, 212A, or 214A.

Resource availability list 212A may include quantity values 216 for different memory categories 213. For example, resource availability list 212A may identify resource node A as having 1 million (M) bytes of Flash 1, 100 Mbytes of Flash 2, 25 Kbytes of RAM 1, 1 billion (B) bytes of disk 1, and 250 Mbytes of disk 2.

Resource performance list 214A may include different normalized storage performance values 218. For example, disk 2 may have a slowest read/write speed and assigned a performance value of 1×. Disk2 may have twice the storage access speed of Disk1 and assigned a performance value of 2×, Flash2 may have twenty times the storage access speed as Disk1 and assigned a performance value of 20×, etc.

The names assigned to memory categories 213 may not directly correspond with the associated physical storage elements. Resource categories 213 are variable and simply indicate a particular storage resource with a particular quantity and performance. For example, Flash 1 and Flash 2 are referred to as flash, but may include different amounts of RAM, or other media resources, that vary quantity values 216 and/or performance values 218.

Memory categories 213 may include tiles or blocks of storage space from different combinations of storage elements. For example, a tile may comprise a 1 Mbyte block of storage space that includes a combination of storage space from one or more Flash storage devices and storage space for one of more random access memory (RAM) storage devices. Cluster resource protocol 208 may exchange cluster resource data 202 with other resource nodes that indicates quantity values 216 and performance values 218 for the tiles.

Status values 211B and quantity 216 constitute the information utilized to determine resource availability. The information within resource availability list 212A and resource performance list 214A is known to other resource nodes. Resource node B (FIG. 3) may evaluate the status is resource node A (shown as available in 211B) and the quantity of available resource Flash 2 (shown as 100M in 216) and determine that selected data currently on media within resource node B should be moved to resource node A. In making this determination, resource node B may evaluate the distance to resource node A (remote since 211C, resource node A's information, indicates B is remote from A) and weight the performance expectation for resource Flash 2 (shown as 20× in 218) by some factor. Thus, resource node B can evaluate whether it will be advantageous to overall performance to move selected data to resource node A based on how that data is currently used in the system, the expected performance of that data once moved and the resulting improved balance of resource among all available resource nodes.

Each resource node A-E maintains associated lists 210, 212, and 214. In one example, each resource node 100 may use cluster access protocol 204 and cluster resource protocol 208 to periodically poll other resource nodes for the contents in node status list 210, resource availability list 212 and/or resource performance list 214. In another example, each resource node 100 may use cluster access protocol 204 and/or cluster resource protocol 208 to periodically push or send node status list 210, resource availability list 212 and/or resource performance list 214 to other resource nodes.

In yet another example, cluster access protocol 204 and/or cluster resource protocol 208 may send periodic resource update messages to other resource nodes that update node status list 210, resource availability list 212, and resource performance list 214. In still yet another example, cluster access protocol 204 and/or cluster resource protocol 208 may send the resource update messages to other resource nodes based on monitored events, such as a threshold percentage change in one of quantity values 216 or performance values 218.

Figure 6:
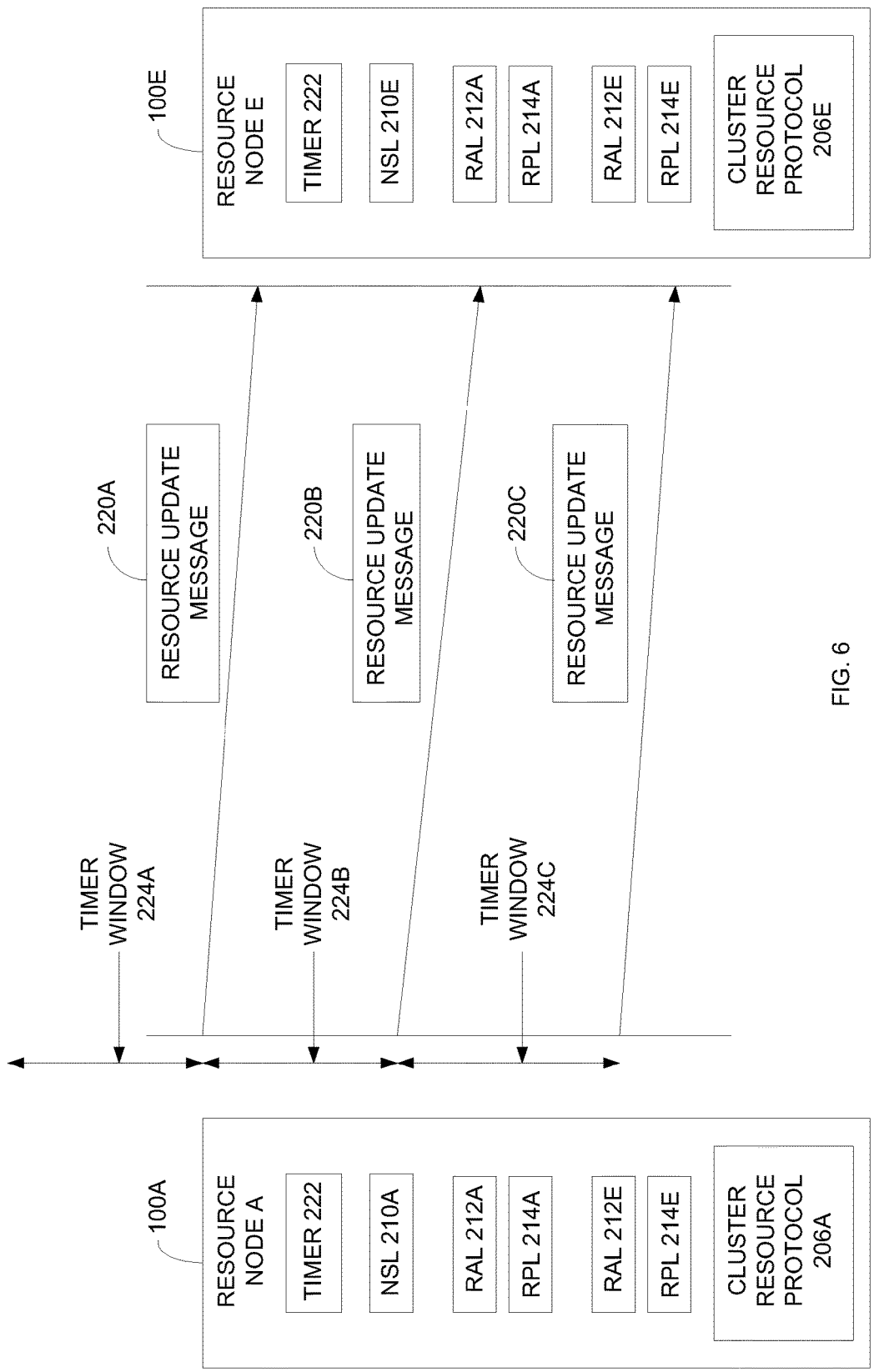
FIG. 6 depicts example resource update messages.

FIG. 6 shows in more detail operations performed by cluster resource protocol 206. As described above, cluster access protocol 204 may identify status values 211B and/or distance values 211C. For explanation purposes, FIG. 6 refers only to cluster resource protocol 206. However, cluster access protocol 204 also may exchange similar messages.

Resource nodes A and E may maintain node status lists (NSL) 210A and 210E, respectively, identifying status values and relative distance values for all other resource nodes. Resource nodes A and E also may each maintain resource availability lists 212A and 212E identifying the quantity values for resource nodes A and E, respectively. Resource nodes A and E also each may maintain resource performance lists 214A and 214E identifying the performance values for resource nodes A and E, respectively.

Resource node A may send resource update messages 220 to all other resource nodes including in this example resource node E. Resource update messages 220 may contain the values described above for node status list 210A, resource availability list 212A, and resource performance list 214A associated with resource node A.

Resource node A may include a timer 222 that automatically sends resource update messages 220 after preset timer windows 224A. For example, resource node A may send a first resource update message 220A that contains updates to lists 210A, 212A, and 214A. Resource node E may update the information in local lists 210E, 212A and 214A.

Resource node A may continue to monitor the information in lists 210A, 212A, and 214A during a next timer window 224B. After the expiration of timer window 224B, resource node A sends another resource update message 220B to resource node E and all other resource nodes that includes any new updates to the information in lists 210A, 212A, and 214A.

In one example, resource node A may send update messages 220 when any of the values in lists 210A, 212A, or 214A changes by some threshold amount. For example, resource node A may send a resource update message 220 to resource node E when one of the quantity values 216 in resource availability list 212A changes by more than 5 Kbytes. Similarly, resource node A may send a resource update message 220 when one of status values 211B, distance values 211C, or performance values 218 (FIG. 5) change by some threshold amount.

Figure 7:
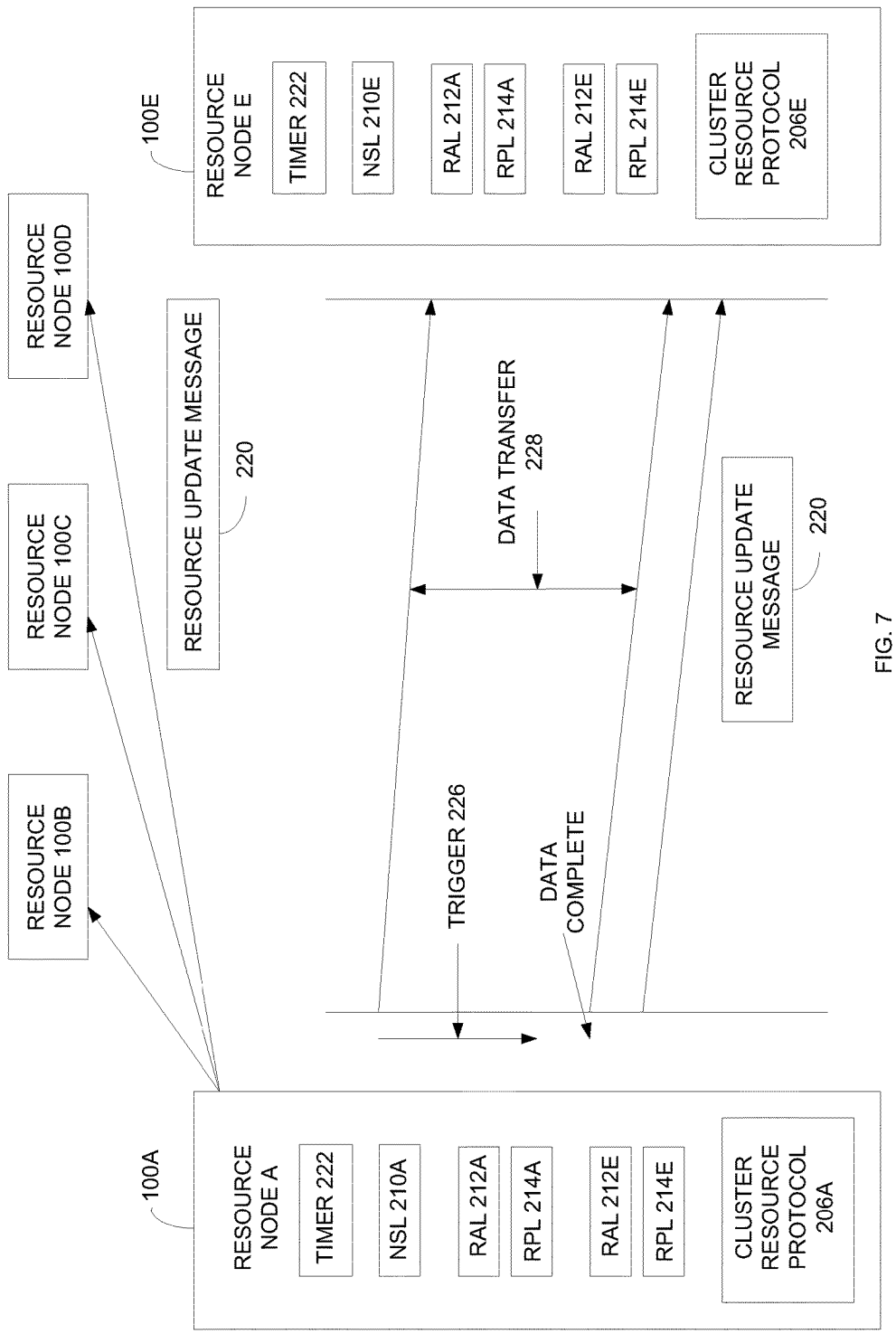
FIG. 7 depicts another example scheme for transferring data and resource update messages.

FIG. 7 shows another example messaging scheme used by cluster resource protocol 206. In this example, resource node A may transfer data 228 to resource node E. For example, a client may be docked with resource node A. The client may send data associated with a storage operation to resource node A. Resource node A may transfer the data to resource node E based on lists 210, 212, and 214.

During data transfer 228, resource node A may detect a trigger event 226 for sending a resource update message to resource node E. For example, the quantity of Flash memory in resource node A may fall by over 5%. Resource node A may delay sending resource update message 220 to resource node E until completing data transfer 228. In one example, resource node A may attach resource update message 220 to the end of data transfer 228. The delay may prevent resource update message 220 from disrupting data transfer 228. For example, packets used for resource update message 220 will not disrupt data packets used in data transfer 228.

In one example, resource node A and E are located on a same server 1 and resource nodes B, C, and D are located on remote servers. Cluster resource protocols 208 exchange resource update messages 220 that populate lists 210, 212, and 214 on all resource nodes B-D. Resource nodes A and E are on the same server and therefore may maintain one set of access lists 210, 212, and 214 in a shared common memory.

In another example, resource update messages 220 may be forwarded to different resource nodes 100 in a ring configuration. For example, resource node A may send resource update messages 220 to resource node B. Resource node B may append local changes for lists 210, 212, and 214 onto the list sent by resource node A. Resource node B then may forward resource update message 220 on to resource node C, etc.

In another example, resource node 100A may receive a write operation from a client. The write operation may identify a particular quantity of write data. The docking configuration for the client also may require a particular storage performance level. For example, the docking configuration may indicate a particular quality of service (QOS) or a particular read rate. The docking configuration may also specify that copies of the data must be kept in remote locations so the data will always be accessible regardless of an entire datacenter being unavailable. For resource optimization, the docking configuration may specify that caching is not to be used when reading the data as little data reuse is expected temporally such as during weekly rollups of transactional information.

Resource node 100A checks local resource availability list 212A and resource performance list 214A to determine if local storage media is available for servicing the storage operation. If not, resource node 100A may check node status list 210A for other available resource nodes 210. For example, the write operation may include 50 MB of data and the client sending the write operation may require 500× performance. Resource availability list 212A and resource performance list 214A may indicate the storage media in resource node 100A is insufficient to handle the write operation.

However, node status list 210A may indicate that resource nodes B and E are also available for write operations. Resource node 100A may use one of the resource nodes B or E best suited for the performance aspects of the write operation. If multiple resource nodes B-E qualify, resource node 100A may try to evenly distribute data over storage media on the different resource nodes.

For example, resource node 100A may determine from resource availability lists 212 and resource performance lists 214 that resource node B has the largest amount of available 500X RAM. Accordingly, resource node 100A may send the write operation to resource node 100B. Resource nodes may use a cross product, lookup table, and/or decision algorithm for selecting the resource nodes for handing off storage operations or transferring data.

In another example, resource node 100A may receive a clone or snapshot storage operation from a system administrator. Cluster data protocol 206 may give higher priority to distance values 211C in node status list 210A than performance values 218 (see FIG. 5). Typically the snapshot data is put in the more available resource. However, snapshot performance may need to be at least as high as the original data. The snapshot data also may affect data locking and latency. Cluster data protocol 206 then may select local resource node E over resource node B to reduce latency even if resource node B includes larger available amounts of storage resources with acceptable performance values 218.

Thus, cluster access protocol 204 and cluster resource protocol 208 provide every resource node 100 with the state of every other resource node 100. The resource nodes 100 may handle storage operations locally or send the storage operations to other resource nodes based on status and distance value in node status list 210, quantity values in resource availability lists 212, and performance values in resource performance lists 214.

Balancing Data

Figure 8:
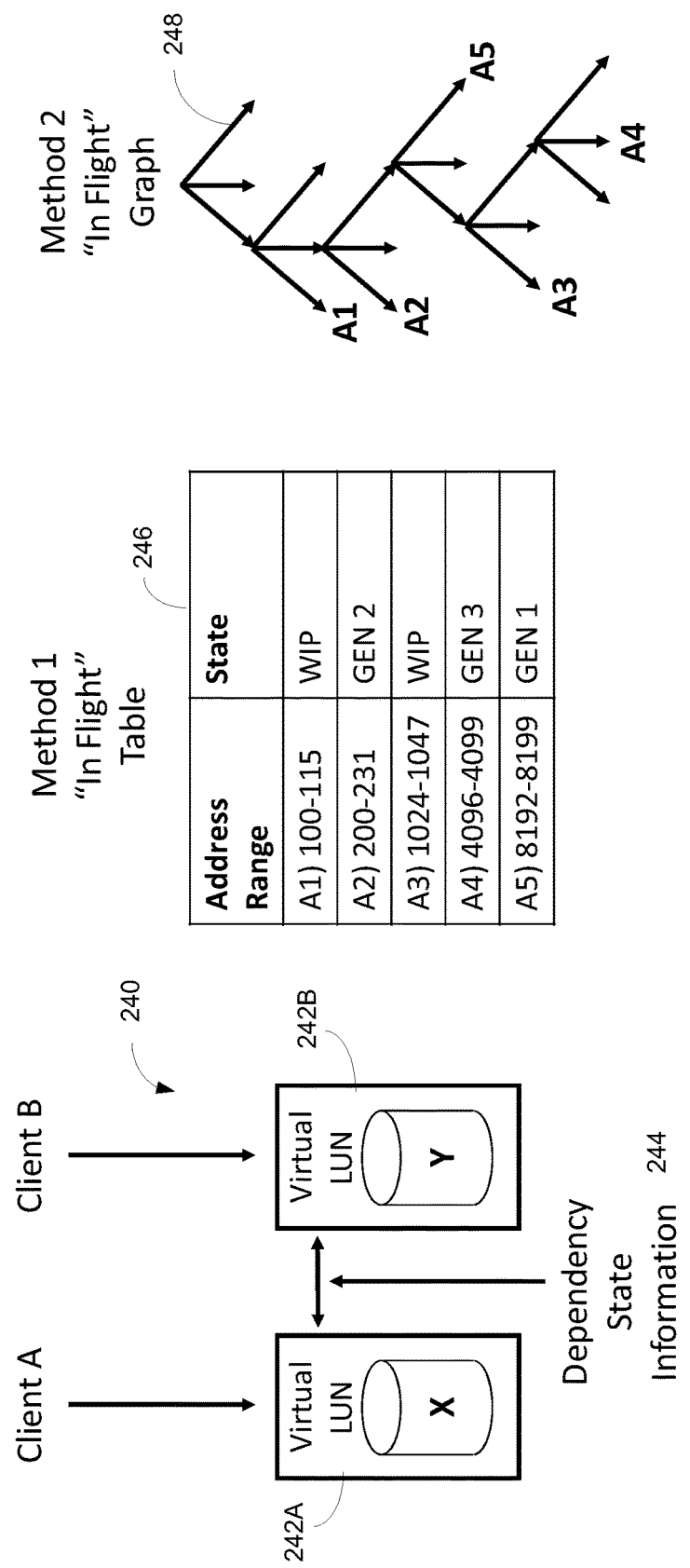
FIG. 8 depicts an example in-flight table and an example in-flight graph.

Referring to FIG. 8, a storage system 240 may store a first version of data 240A on a first virtual logical unit number (LUN) X and store a snapshot 240B of the data on a second LUN Y. An administrator may create more than one snapshot of data 242 for use with different clients. For example, the administrator may need to create 1000 snapshots of operating system data for operating locally with 1000 different clients.

Storage system 240 would then need to manage state information 244 for 1000 versions of data 242. Storage system 240 may use an in-flight table 246 or in-flight graph 248 to track the status of different address ranges within the different snapshots 242. For example, storage system 240 may need to track each generation (GEN) or version of data 242 for each different address range A1-A5 and track states for each of the different address ranges, such as write in progress (WIP) state.

Figure 9:
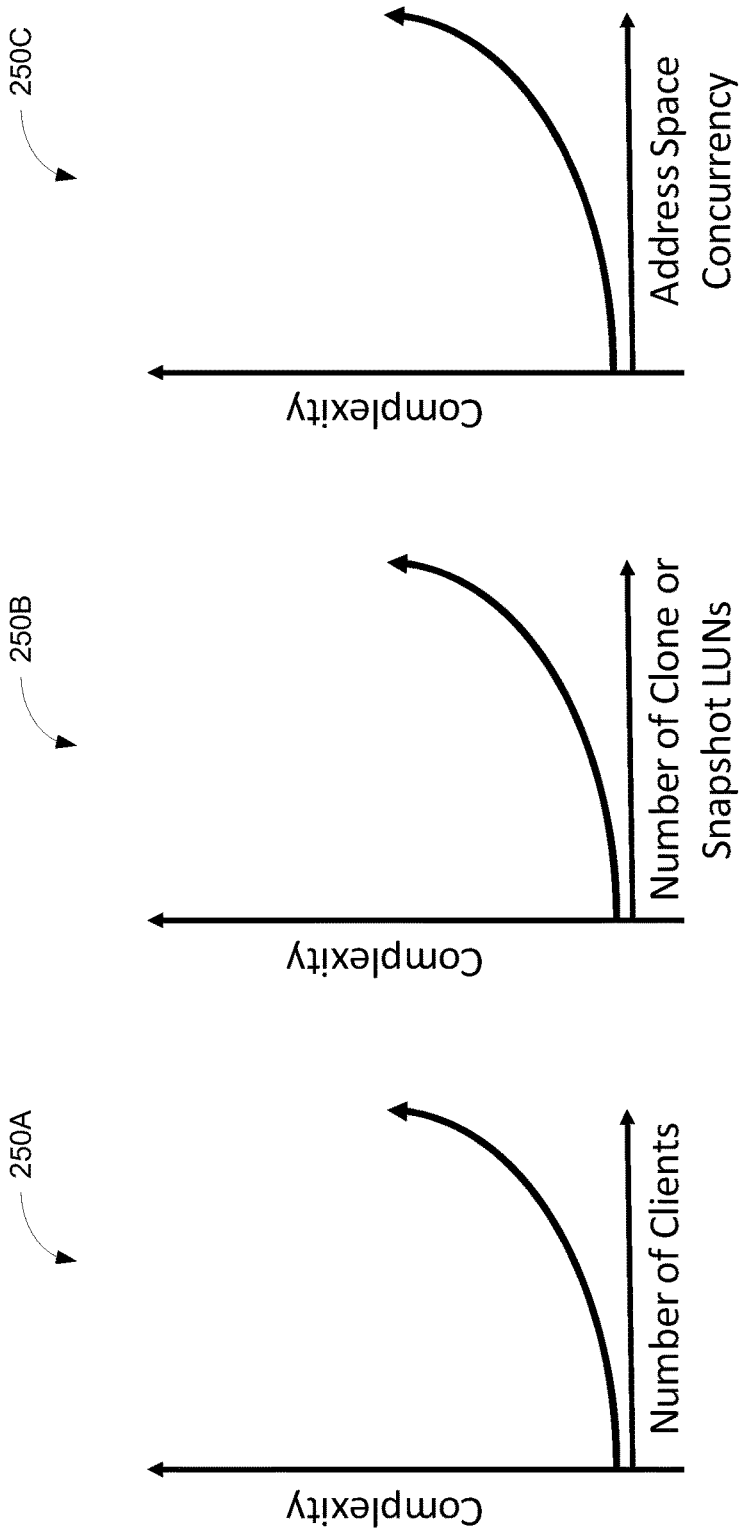
FIG. 9 depicts example graphs showing how storage complexity exponentially increases due to different storage conditions.

Referring to FIGS. 8 and 9, the complexity of managing in-flight table 246 or in-flight graph 248 may increase exponentially. For example, graph 250A shows that complexity of table 246 or graph 248 may increase exponentially with the number of clients accessing the data. Graph 250B shows that complexity may increase exponentially with the number of LUNs storing different versions of the data. Graph 250C shows complexity of managing table 246 or graph 248 may increase exponentially with the usage amount of the same address space referred to as concurrency.

For example, more clients, more LUNs, and/or more concurrency may require storage system 240 to monitor and maintain more states for a larger number of address ranges within a larger amount of data. The different address ranges and the different states tracked by table 246 or graph 248 may increase exponentially with the number LUNs storing copies of the data, the amount of data, or the amount of clients accessing the data.

The time required to access data in the storage system may increase exponentially in conjunction with the exponential increase in table or graph complexity. For example, each storage operation may place a lock on in-flight table 256 or in-flight graph 248 while identifying the status of an associated address range and completing the associated storage operation. Splitting in-flight table 246 or in-flight tree 248 in FIG. 8 down the middle still may not solve the complexity problem described above since the increased usage still may be associated with one particular half of table 246 or 248.

Figure 10:
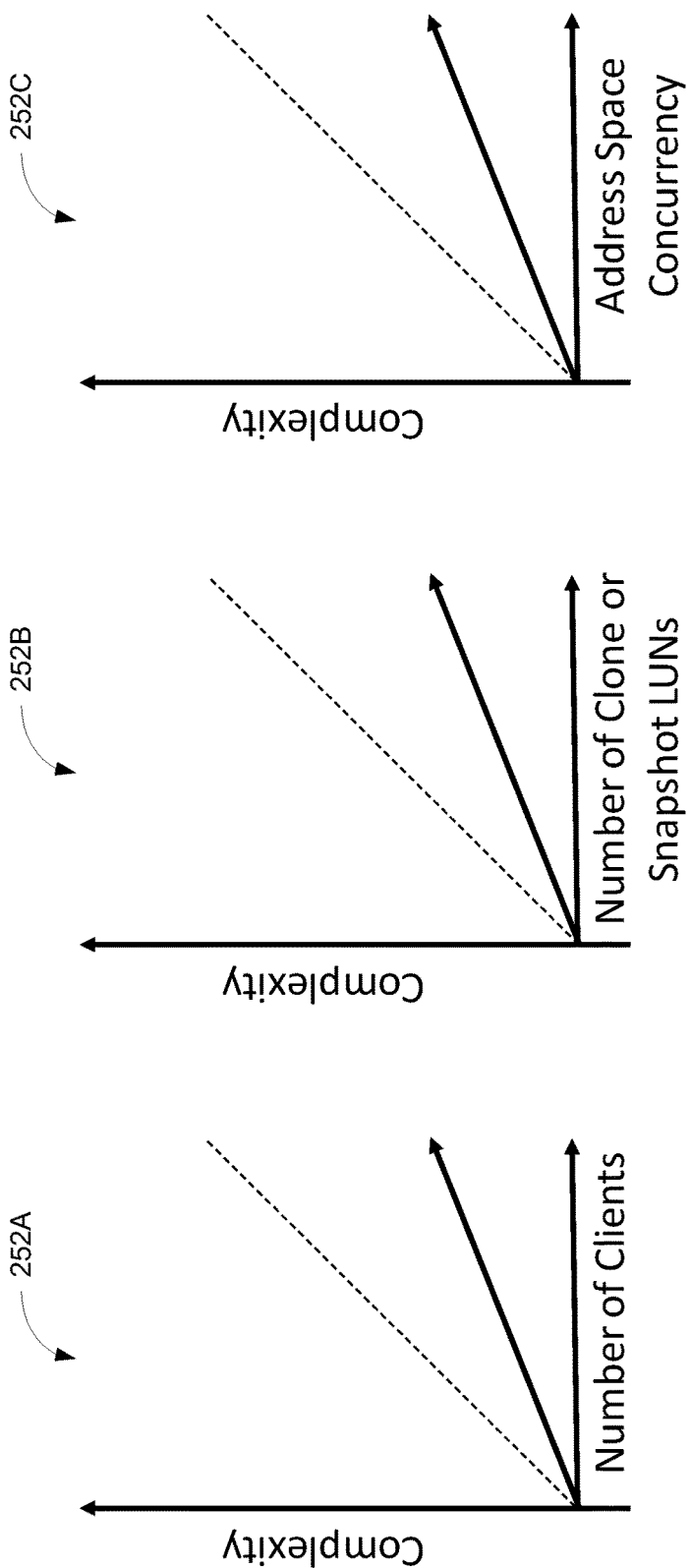
FIG. 10 depicts example graphs showing how storage complexity increases sub-linearly due to different storage conditions.

Referring to FIG. 10, the cluster interface described above provides a sub-linear relationship between storage scaling and storage operation complexity. Each of graphs 252A, 252B, and 252C represent similar increases in clients, data replications, and address space concurrently as previously represented in graphs 250A, 250B, and 250C in FIG. 9.

The cluster data protocol solves problems with exponentially increasing storage complexity by dynamically identifying different types of data utilization and redistributing the data based on the type of utilization to other resource nodes. The cluster data protocol reduces the normal exponential increases in storage complexity to sub-linear increases in complexity. Accordingly, the resource nodes can scale to handle more clients, data replications, and concurrency without excessive reductions in storage performance.

The cluster data protocol also uses cluster resource data 202 (FIG. 5) to optimally distribute data to the most appropriate storage media. The cluster data protocol may dynamically and continuously distribute data to different resource nodes without any client knowledge.

Figure 11:
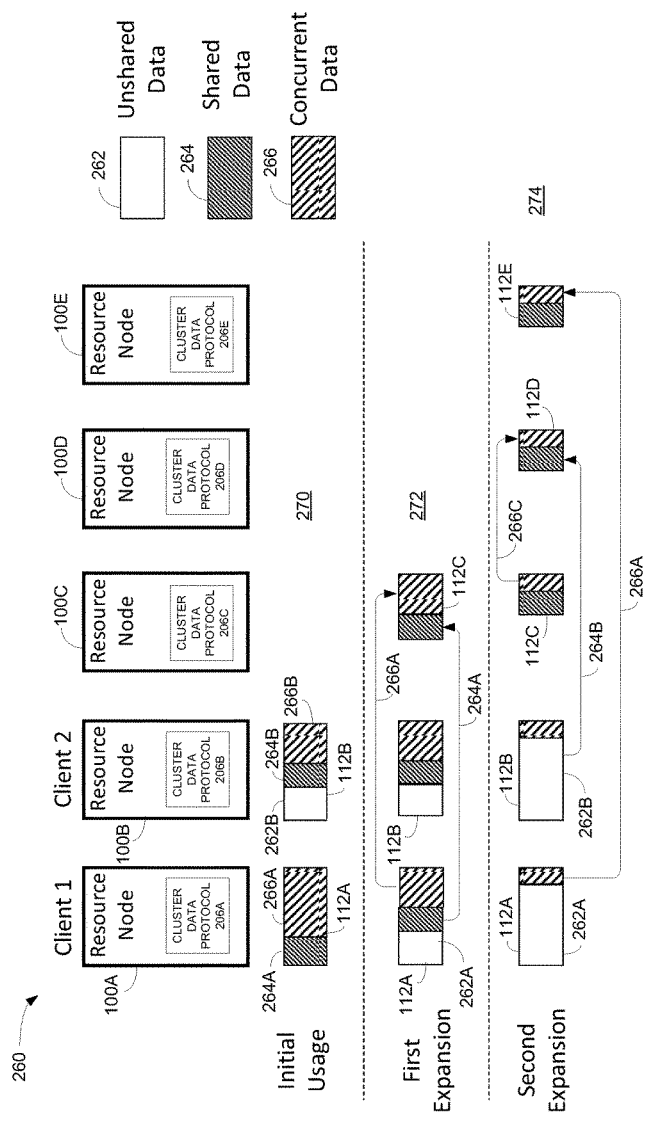
FIG. 11 depicts an example cluster data protocol.

FIG. 11 shows an example of how the resource nodes maintain sublinear storage complexity. In this example, a resource node cluster 260 includes resource nodes 100A-100E each having associated storage media 112A-112E, respectively.

In this example, resource nodes 100 distinguish between three different types of data. Unshared data 262 may include data that is only used by a single client or relatively few clients. For example, unshared data may include local documents typically stored and accessed by one user. Cluster data protocol 206 may have the most flexibility storing unshared data 262 in different storage locations. Shared data 264 may include documents, database tables, and/or objects primarily read by multiple clients possibly at the same time. For example, web pages may be read by large number of clients but may only be edited or written by a few number of clients.

Concurrent data 266 may include any data that is read and modified relatively frequently by multiple clients. For example, concurrent data 266 may include inventory data that is frequently read and then modified based on customer orders. However, the rolled up transaction logs for the inventory data may only be accessed by a few clients and treated by resource nodes 100 as unshared data 262.

Resource node 100A may consider data when first written into storage media 112A as unshared data 262. For example, client 1 may initially write data into a first address range of storage media 112A. Resource node 100A may change the classification of unshared data 262 to shared data 264 when multiple clients start reading the data from that particular address range in storage media 112A. Resource node 100A may change the classification of unshared data 262 or shared data 264 to concurrent data 264 when multiple clients start reading and modifying the data in a same address range of storage media 112A.

Cluster data protocol 206 may automatically distribute, redistribute, and balance the different types of data 262, 264, and 266 to different storage media 112A-112E associated with resource nodes 100A-100E, respectively. The balanced data increases overall storage efficiency and enables resource node cluster 260 to maintain sub-linear storage complexity for increased storage utilization.

For example, during an initial usage state 270, resource node 100A may receive shared data 264A and concurrent data 266A from client 1. Resource node 100B may receive unshared data 262B, shared data 264B, and concurrent data 266B from client 2. Storage media 112A in resource node 110A may contain a relatively small amount of shared data 262A and a relatively large amount of concurrent data 266A. Storage media 112B associated with resource node 110B may store relatively even amounts of unshared data 262B, shared data 264B, and concurrent data 266B.

During a first expansion stage 272, resource node 100A may receive unshared data 262A from client 1. Cluster data protocol 206A in resource node 100A may distribute some of shared data 264A in storage media 112A to storage media 112C in resource node 100C. Cluster data protocol 206A in resource node 100A also may transfer some of concurrent data 266A in storage media 112A to storage media 112C in resource node 100C. Storage media 112A now stores relatively even amounts of unshared data 262A, shared data 264A, and concurrent data 266A. Storage media 112A, 112B, and 112C also now store relatively even amounts of concurrent data 266.

In expansion stage 272, storage media 112A and 112B each include unshared data 262 for clients 1 and 2, respectively. Unshared data 262 is typically not used by other clients. Therefore, cluster data protocols 206A and 206B may be less likely to distribute unshared data 262 in storage media 112A and 112B, respectively, to other resource nodes.

Shared data 264A is typically read and not modified. Therefore, cluster data protocol 206A may store shared data 264A in a storage media, such as storage media 112C, with a large amount of available Flash memory. Concurrent data 266A is typically read and modified and typically adds more storage complexity. Therefore, cluster data protocols 206 may try to redistribute concurrent data 266A among storage media in resource nodes, such as storage media 112C, with are large amounts of available RAM memory.

A second expansion 274 distributes shared data 264 and concurrent data 266 over all five storage media 112A-112E. For example, cluster data protocol 206A may transfer some of concurrent data 266A to storage media 112E, cluster data protocol 206B may transfer shared data 264B to storage media 112D, and cluster data protocol 206C may redistribute some of concurrent data 266C to storage media 112D. However, cluster data protocols 206A and 206B may retain all of unshared data 262A and 262B for clients 1 and 2 on associated storage media 112A and 112B, respectively.

Distributing concurrent data 266 over more storage media 112 further reduces storage complexity on each resource node 100 within the more efficient above reference sub-linear region. Distributing shared data 264 to storage media 112C, 112D, and 112E may prevent conflicts with unshared data 262A and 262B on storage media 112A and 112B, respectively.

Cluster data protocol 206 may identify changes in unshared data 262, shared data 264, and concurrent data 266 for different address blocks of data, such as 4 kbytes. Cluster data protocol 206 then may distribute the 4 kbytes data blocks to other storage media 112 based on the amount, types, and performance of available storage media.

Cluster data protocol 206 may transfer data to different resource nodes 100 based on many different factors. Cluster data protocol 206 also may distribute data based on quantity values 216 in resource availability list 212 and performance values 218 in resource performance list 214 (FIG. 5). For example, storage media 112B for resource node 100B and storage media 112D for resource node 100D may each currently use 5% of available Flash. A next resource update message 220 (FIG. 7) may indicate the Flash memory in storage media 112B is performing slower than the Flash memory in storage media 112D. Accordingly, cluster data protocol 206B in resource node 100B may transfer shared data 264B from storage media 112B to storage media 112D in resource node 100D.

If performance of Flash in storage media 112D starts to substantially decrease, cluster data protocol 206D in resource node 100D may redistribute portions of the shared data 264B received from resource node 100B to other resource nodes. Cluster data protocol 206 can use a hysteresis scheme to delay premature data transfers. For example, cluster data protocol 206 may delay transferring data after detecting a trigger event for some predetermined time period. Cluster data protocol 206 then transfers the data if the trigger event is maintained during the predetermined time period. Otherwise the transfer is aborted.

Resource node 100A may not inform client 1 when data is distributed to other resource nodes 100 or may not notify client 1 that other resource nodes 100 even exist. Resource node 100A may track which address ranges of data in storage media 112A are transferred to other resource nodes and then send storage operations for those address ranges to the associated resource nodes 100B-100E.

Figure 12:
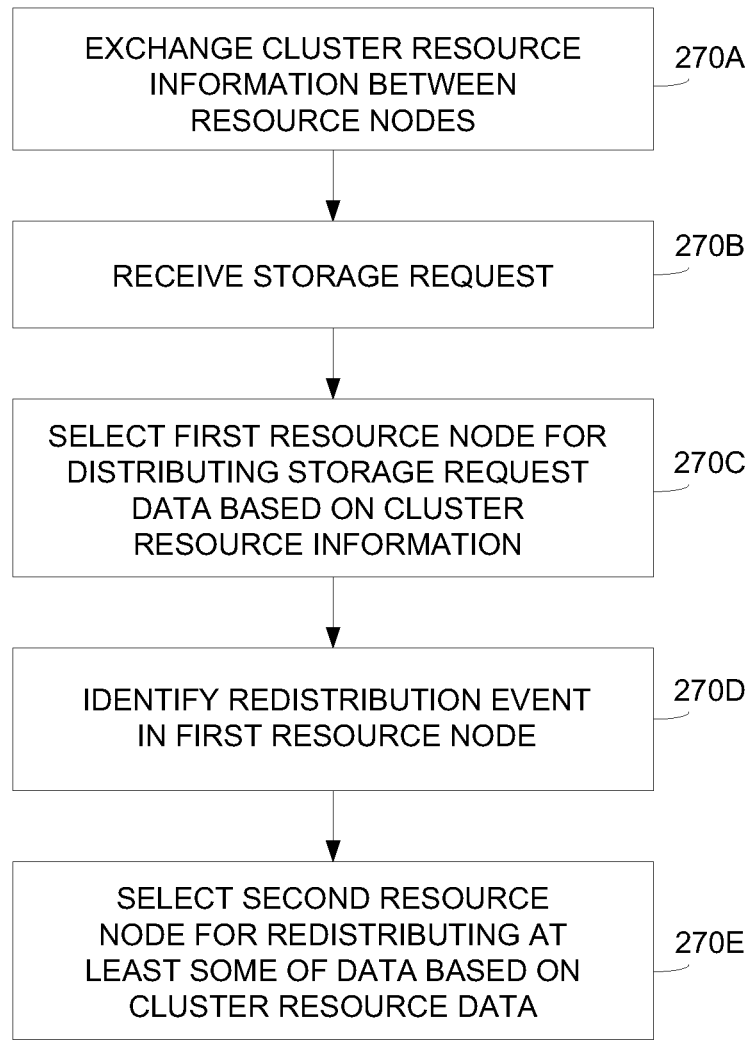
FIG. 12 depicts an example process for distributing and redistributing data.

FIG. 12 depicts an example process for distributing data between different resource nodes. In operation 270A, the resource nodes exchange messages that contain cluster resource information. For example, the messages may contain any of the status values, distance values, quantity values, or performance values described above.

In operation 270B, one of the resource nodes may receive a storage request, such as a write operation. In operation 270C, the resource node may select a first resource node for storing data for the write operation. For example, the resource node may select the residing storage media or select storage media on another resource node for storing the data. The resource node may select the first resource node based the type of unshared, shared, or concurrent data associated with the storage request; and/or the status, distance, quantity, or performance of storage media in the resource nodes.

In operation 270D, the first resource node detects a redistribution event. For example, the cluster resource information for the first resource node may indicate a reduction in quantity or performance for a particular type of storage media. In another example, the first resource node may identify a particular threshold amount of unshared data, shared data, or concurrent data in the associated storage media.

In operation 270D, the first resource selects a second resource node for redistributing the data based on any of the factors described above in operation 270C. For example, based on an increase in concurrent data or based on a reduction in performance or quantity of RAM, the first resource node may select a second resource node with more available RAM. If two resource nodes have equivalent amounts of RAM and other storage media, the first resource node may select the resource node with more local distance value.

Thus, distributing data as described above maintains a relatively low storage complexity level on each resource node. The lower complexity prevents exponential increases in storage processing and associated storage access times caused by increased data usage.

Digital Processors, Software and Memory Nomenclature

The processing and/or computing devices described in this application, including both virtual and/or physical devices, include a storage media configured to hold remote client data and include an interface configured to accept remote client storage commands.

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or Flash memory embedded in an integrated circuit Central Processing Unit (CPU), network processor or the like. In other examples, the memory comprises a physically separate device, such as an external disk drive, storage array, or portable Flash device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, Flash, etc. Those technologies often are implemented in solid state semiconductor devices. Other memories may comprise moving parts, such as a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. A method for controlling utilization in a data storage system, comprising:
   using, by a resource node including a hardware processor, a cluster resource protocol to exchange cluster resource information indicating a quantity and a performance for storage media associated with multiple resource nodes;
   receiving, by the resource node, a storage request from a client to write data;
   selecting, by the resource node, a first one of the resource nodes for storing the data responsive to the cluster resource information;
   distributing, by the resource node, the data to the first one of the resource nodes;
   redistributing, by the selected first one of the resource nodes, at least some of the data to a second one of the resource nodes responsive to the cluster resource information, wherein redistributing the data includes:
   identifying, by the first one of the resource nodes, a first type of unshared utilization for a first portion of the data;
   identifying, by the first one of the resource nodes, a second type of shared utilization for a second portion of the data;
   identifying, by the first one of the resource nodes, a third type of concurrent utilization for a third portion of the data; and
   redistributing, by the first one of the resource nodes, at least one of the first, second, or third portion of data to the second one of the resource nodes based on the cluster resource information associated with the second one of the resource nodes.

2. The method according to claim 1, further comprising:
receiving, by the resource node, dock configurations identifying reconfigurable sets of storage extensions;
identifying, by the resource node, one of the dock configurations associated with the client;
generating, by the resource node, storage operations for implementing the storage extensions for the identified dock configurations; and
using, by the resource node, the storage operations for executing the storage request.

3. The method of claim 1, further comprising:
exchanging, by the resource node, node status lists with the other resource nodes that identify an availability of the storage media associated with resource nodes for servicing the storage request; and
selecting, by the resource node, the first one of the resource nodes for servicing the storage request based on the availability of the storage media.

4. The method of claim 1, further comprising:
exchanging, by the resource node, node status lists with the other resource nodes that identify network distances between the resource nodes; and
identifying, by the resource node, the first one of the resource nodes for servicing the storage request based on the network distances.

5. The method of claim 1, further comprising:
exchanging, by the resource node, resource quantity lists with the other resource nodes that identify quantities of available types of memory in the associated storage media; and
identifying, by the resource node, the first one of the resource nodes for servicing the storage request based on the quantities of the available types of memory.

6. The method of claim 5, further comprising:
exchanging, by the resource node, resource performance lists with the other resource nodes that identify storage access performance for the available types of memory in the storage media; and
identifying, by the resource node, the first one of the resource nodes for servicing the storage request based on the storage access performance of the different types of memory.

7. The method of claim 1, further comprising:
receiving, by the resource node, a snapshot storage operation from the client; and
identifying, by the resource node, the first one of the resource nodes for servicing the snapshot storage operation based on availability, network distance, quantity of storage devices, and performance of storage devices indicated in the cluster resource information for the storage media associated with the resource nodes.

8. The method of claim 1, further comprising:
identifying, by the first one of the resource nodes, types of utilization for different portions of the data; and
redistributing, by the first one of the resource nodes, the different portions of the data to the second one of the resource nodes based on the utilization.

9. The method of claim 1 further comprising:
identifying, by the resource node, in the cluster resource information a number of the tiles in the storage media associated with the different resource nodes, wherein the tiles comprise blocks of storage space; and
identifying, by the resource node, the first one of the resource nodes for servicing the storage request based on the number and a performance of the tiles in the storage media associated with the different resource nodes.

10. The method of claim 9, wherein the tiles comprise portions of different storage media.

11. An apparatus for controlling memory utilization in storage media, comprising:
an interface configured to receive cluster resource information identifying quantity and performance values associated with different resource nodes and further configured to receive a storage request from a client;
storage media configured to store data associated with the storage request; and
a hardware processor configured to:
select a first one of the resource nodes for storing the data associated with the storage request responsive to types of data usage in the first resource node and the cluster resource information associated with the different resource nodes, wherein the first resource node is configured to redistribute at least some of the data to a second one of the resource nodes responsive to the changes in the types of data usage in the first resource node and changes in the cluster resource information associated with the different resource nodes;
identify a concurrent read and write usage for a first portion of the data;
redistribute at least some of the first portion of the data to the second resource node based on the concurrent read and write usage;
identify from the cluster resource information the second resource node or a third resource node with a highest quantity of available random access memory;
redistribute at least some of the data to the second resource node or third resource node with the highest quantity of available random access memory;
identify a shared read usage for a second portion of the data; and
identify from the cluster resource information one of the second resource node or third resource node with a highest quantity of available Flash memory; and
redistribute at least some of the second portion of the data to the second resource node or third resource node with the highest quantity of available Flash memory.

12. The apparatus of claim 11, wherein the first resource node is further configured to:
identify an unshared usage for a third portion of the data; and
maintain the third portion of the data in the first resource node.

13. The apparatus of claim 11, wherein:
the first resource node is configured to receive resource messages from the second resource node indicating a distance of the second resource node from the first resource node; and
redistribute different portions of the data to the second resource node based on the distance of the second resource node from the first resource node.

14. The apparatus of claim 13, wherein:
the cluster resource information identifies the quantity values and performance values for different types of storage elements in the first and second resource nodes, the quantity values indicate an amount of available memory in the storage elements in the first and second resource nodes, and the performance values indicate relative storage access rates for the storage elements in the first and second resource nodes; and
the processor is configured to transfer different portions of the data to the first and second resource nodes based on the amount of the available memory and the relative storage access rates.

15. The apparatus of claim 11 wherein the processor is further configured to:
  identify tiles within the storage media, wherein the tiles comprise blocks of storage space; and
  identify a number and performance of the tiles associated with the different resource nodes in the cluster resource information.

16. The apparatus of claim 15, wherein the tiles comprise portions of different storage media.

17. A distributed storage system, comprising:
  multiple resource nodes each having associated storage media, wherein the resource nodes are configured to:
  operate a first protocol that exchanges messages between the resource nodes that identify availability and performance information for storage elements in the associated storage media;
  operate a second protocol that distributes and redistributes data between the different resource nodes based on the availability and performance information for the storage elements;
  identify types of unshared use, shared use, and concurrent use for different portions of the data; and
  distribute and redistribute the different portions of the data to the different resource nodes based on the identified types of unshared use, shared use, and concurrent use.

18. The distributed storage system of claim 17, wherein the first protocol also identifies relative distances between the different resource nodes and the second protocol weights the availability and performance information based on the relative distances.

19. The distributed storage system of claim 17, wherein the resource nodes are further configured to:
  receive dock configurations identifying reconfigurable sets of storage extensions for the resource nodes;
  receive storage requests from clients;
  identify the dock configurations associated with the clients;
  generate storage operations for implementing the storage extensions for the identified dock configurations; and
  use the storage operations for executing the storage requests.

* * * * *